Jan 6, 1931. J. G. JONES 1,787,824
METHOD AND APPARATUS FOR TINTING PHOTOGRAPHIC FILM
Filed May 9, 1929
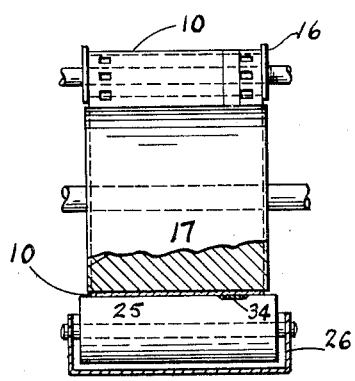
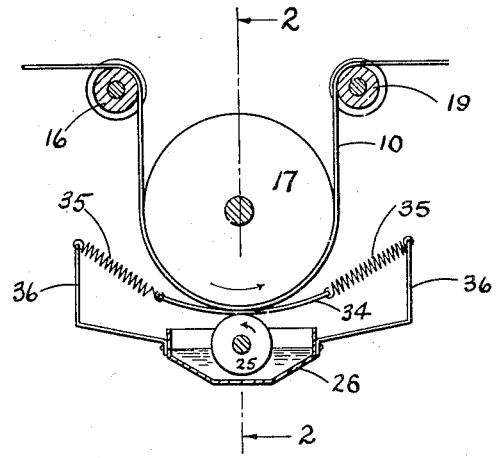
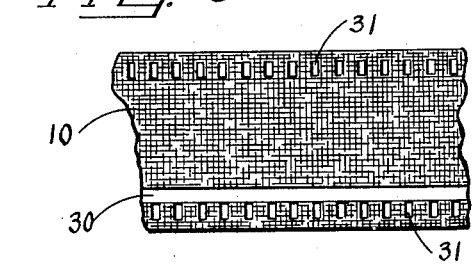
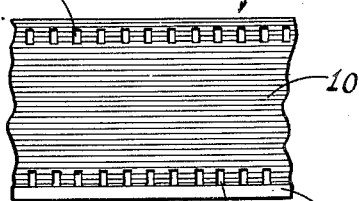
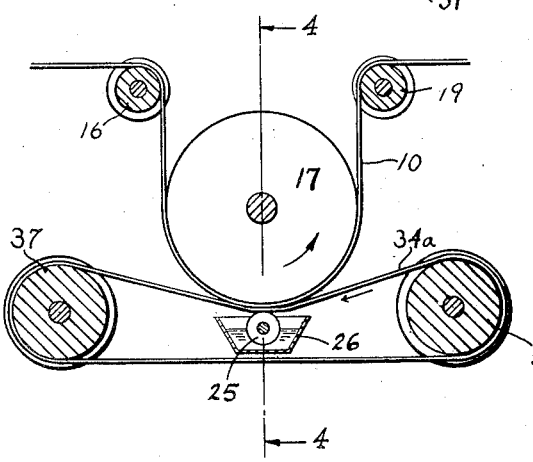
INVENTOR
JOHN G. JONES
BY
ATTORNEY Patented Jan. 6, 1931

1,787,824

UNITED STATES PATENT OFFICE

JOHN G. JONES, OF ROCHESTER, NEW YORK, ASSIGNOR TO EASTMAN KODAK COMPANY, OF ROCHESTER, NEW YORK, A CORPORATION OF NEW YORK

METHOD AND APPARATUS FOR TINTING PHOTOGRAPHIC FILM

Application filed May 9, 1929. Serial No. 361,731.

This invention relates to photographic film for the combined production of motion pictures with sound accompaniment and the method of preparing the same.

In the production of so-called silent motion pictures it has long been the practice to tint the film with various dyes to present certain pleasing effects when the pictures are projected on the screen. It has been found, however, that the use of such dyes on the sound record portion of a film interferes with the satisfactory reproduction of sound from such record. It has, therefore, been proposed to tint only the motion picture areas of the film while preserving the sound record area untinted. This has presented a real problem since it is essential not only that the tinted layer be of uniform thickness but it must also have straight, accurately defined margins. These exact requirements for tinting have rendered it especially difficult to produce such film in commercial quantities.

In accordance with the present invention it is proposed to mask the surface corresponding to the sound record area of the film by a stencil or similar element and to effect a wiping action of the film by the stencil, at the point where the tint is being applied. Another feature of the invention includes the use of a movable stencil in applying a layer of tint to desired areas only of a motion picture film. A further feature of the invention includes the novel method of tinting the motion picture areas of the film while preserving the sound record portion untinted.

These and other features will appear from the detailed description and claims when taken with the drawings in which Fig. 1 is a front sectional view on the line 2—2 of Fig. 2 showing the essential portion of a device for tinting motion picture film in accordance with the present invention; Fig. 2 is a side view partially in section; Fig. 3 is a sectional side view on the line 3—3 of Fig. 4 showing a portion of a modified form of the device for tinting motion picture film; and Fig. 4 is a front sectional view taken on the line 4—4 of Fig. 3; and Figs. 5 and 6 show pieces of film that have been tinted by the devices shown in Figs. 1 to 4 inclusive.

Referring to the arrangement shown in Figs. 1 and 2, 10 designates a strip of motion picture film on the motion picture area of which a tinted layer is to be applied. This film passes over an idler roll 16 and thence about roll 17 which may or may not be heated and thence about the idler roll 19 to any suitable take-up reel. The tint contained in a reservoir 26 is applied to the desired portion of the film by a roller 25 rotating in a direction opposite to the rotation of the roll 17. In order to preserve the sound record portion 30 of the film untinted a narrow band of flexible material 34, which may be of metal, is resiliently supported by springs 35 suspended from the brackets 36.

In the operation of this device the film 10 is advanced toward the right by the roll 17 being guided by the idler rolls 16 and 19. The tint applying roll 25 rotating in the opposite direction from the roll 17, dips into the dye in the reservoir 26, and continuously applies a layer of tint to the film 10 except on that portion of the film corresponding to the sound track which is covered by the flexible band 34 serving as a mask or stencil.

In the modification shown in Figs. 3 and 4 the flexible strip 34 is replaced by a flexible belt 34a which is driven by the pulleys 37—37 in the direction indicated by the arrow. In this modification the film 10 is advanced to the right over the rolls 16, 17 and 19 while the tint applying roll 25 applies a layer to all portions of one surface of the film except the part that is protected by the flexible belt 34a. This belt preferably moves faster than the belt 10 and since it moves in the opposite direction from the film it serves continuously to wipe the sound record portion of the film.

In Figs. 5 and 6, two sections of tinted motion picture film are represented. In the section shown in Fig. 5 a sound record area 30 is positioned between the two series of perforations 31, preferably adjacent to one of these series while in Fig. 6 the sound record 30 is positioned between one of the series of perforations 31 and the nearest margin of the film.

It will be understood that the present disclosure is for purposes of description only and that this invention is to be limited only by the following claims.

What I claim is:

1. A device for tinting the motion picture areas of a photographic film while preserving the sound record area thereof untinted, which comprises means including a roll about which the film is advanced, a flexible stencil partially wrapped about said roll to mask the sound record area of said film, and means for applying a layer of tint to the stencil and to the film adjacent thereto.

2. A device for tinting the motion picture areas of a photographic film while preserving the sound record area thereof untinted, which comprises means including a roll about which film is advanced, an arcuate stencil capable at least of limited longitudinal movement and engaging the film, and means for applying a layer of tint to the stencil and to the film adjacent thereto.

3. A device for tinting the motion picture areas of a photographic film while preserving the sound record area thereof untinted, which comprises means including a roll about which the film is advanced, an endless belt having a portion partially wrapped about said roll to mask the sound record area of the film, means for advancing said belt in a direction opposite to and at a different speed from that of the film, and means for applying a layer of tint to the stencil and to the film adjacent thereto.

Signed at Rochester, New York, this 3rd day of May, 1929.

JOHN G. JONES.